(12) United States Patent
Baldwin et al.

(10) Patent No.: US 9,411,831 B2
(45) Date of Patent: Aug. 9, 2016

(54) PHOTO CLUSTERING INTO MOMENTS

(71) Applicant: Facebook, Inc., Menlo Park, CA (US)

(72) Inventors: Robert M. Baldwin, San Francisco, CA (US); Emily B. Grewal, Palo Alto, CA (US); Ashwin Ravindra Bharambe, Sunnyvale, CA (US); Andrew Chung, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 186 days.

(21) Appl. No.: 13/782,833

(22) Filed: Mar. 1, 2013

(65) Prior Publication Data

US 2014/0250126 A1    Sep. 4, 2014

(51) Int. Cl.
G06F 17/30        (2006.01)
G06F 17/22        (2006.01)

(52) U.S. Cl.
CPC ........ *G06F 17/3028* (2013.01); *G06F 17/2247* (2013.01); *G06F 17/30041* (2013.01); *G06F 17/30044* (2013.01)

(58) Field of Classification Search
CPC .......... G06F 17/2247; G06F 17/30041; G06F 17/30044
USPC .......... 382/159–161, 225–228; 707/737, 796, 707/797, 798
See application file for complete search history.

(56) References Cited

U.S. PATENT DOCUMENTS

| | | | |
|---|---|---|---|
| 8,243,988 B1 | 8/2012 | Buddemeier | |
| 8,352,465 B1 | 1/2013 | Jing | |
| 8,832,119 B2 * | 9/2014 | Girgensohn et al. | 707/749 |
| 2008/0205772 A1 | 8/2008 | Blose | |
| 2011/0099199 A1 * | 4/2011 | Stalenhoef | G06F 17/3028 707/770 |
| 2011/0235858 A1 * | 9/2011 | Hanson | G06F 17/3028 382/103 |
| 2012/0301039 A1 | 11/2012 | Maunder | |
| 2013/0054604 A1 | 2/2013 | Boldyrev | |
| 2013/0191723 A1 * | 7/2013 | Pappas | G06F 17/30917 715/234 |
| 2016/0034459 A1 * | 2/2016 | Larsen | G06F 17/30044 707/740 |

OTHER PUBLICATIONS

International Search Report and Written Opinion from International Application No. PCT/US2014/018640, 9 pages, Jul. 2, 2014.

* cited by examiner

*Primary Examiner* — Marc Filipczyk

(74) *Attorney, Agent, or Firm* — Baker Botts L.L.P.

(57) ABSTRACT

In one embodiment, a method includes automatically and without user input grouping one or more images captured by a first user into clusters of particular moments based at least in part on metadata associated with one or more of the images or data determined through analysis of one or more of the images. Each particular moment being associated with a particular geo-location and time. The method also includes, for each of one or more of the clusters, determining curating information corresponding to the cluster based at least in part on the metadata associated with images in the cluster, the data determined through analysis of images in the cluster, or social-graph information associated with images in the cluster; and providing the clusters of images and at least some of the curating information corresponding to them for display on a computing device of the first user.

18 Claims, 7 Drawing Sheets

PHOTO CLUSTERING INTO MOMENTS

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, images captured by a user, such as on "camera roll" of the mobile device, may be automatically clustered into moments in time or groups of images that are associated with a particular event or date and time. For example, metadata of images and social information may be used to determine what the moment is, e.g. dinner with a group of friends, and group the images based on what the moment is. The clustering may be performed based at least in part on metadata associated with the group of images or other social data, such as for example, date and time stamp of the images, determination of "friends" in the images through facial recognition, global positioning system (GPS) location data of images (if enabled by the user), check-in information, "events" information, or status updates tagging other users. An example user interface may automatically provide curating information for the moment that may include a title, date, location, or continuous location readings, information identifying other users, or computer vision or analysis of characteristics of images (e.g. lighting or objects in image). For example, the user may be at a particular restaurant for dinner at, such as for example Pizza Defina, with user Bob. The social-networking system may automatically group the images associated with the dinner with an example heading, such as for example "Dinner with Bob at Pizza Defina" without input from the user.

In particular embodiments, an example image clustering algorithm may based at least in part on time and geo-location associated with the images. The images in the camera roll may be sequentially analyzed to determine whether a current image should be grouped with the previous image. In particular embodiments, a image that was taken within a first pre-determined amount of time, such as for example, half an hour, may be grouped with the previous image. In particular embodiments, a image that was taken more than a second pre-determined amount of time, such as for example, three hours, may be placed in a group separate from the previous image. For images taken at a time more than the first pre-determined amount of time and less than the second pre-determined amount of time, a standard deviation of the location may be determined. For example, an average amount of movement for the images of the entire camera roll is calculated and if the movement of the current image is within a standard deviation of the average amount of movement of the entire camera roll, the image may be grouped with the previous photo.

DESCRIPTION OF EXAMPLE EMBODIMENTS

Figure 1:
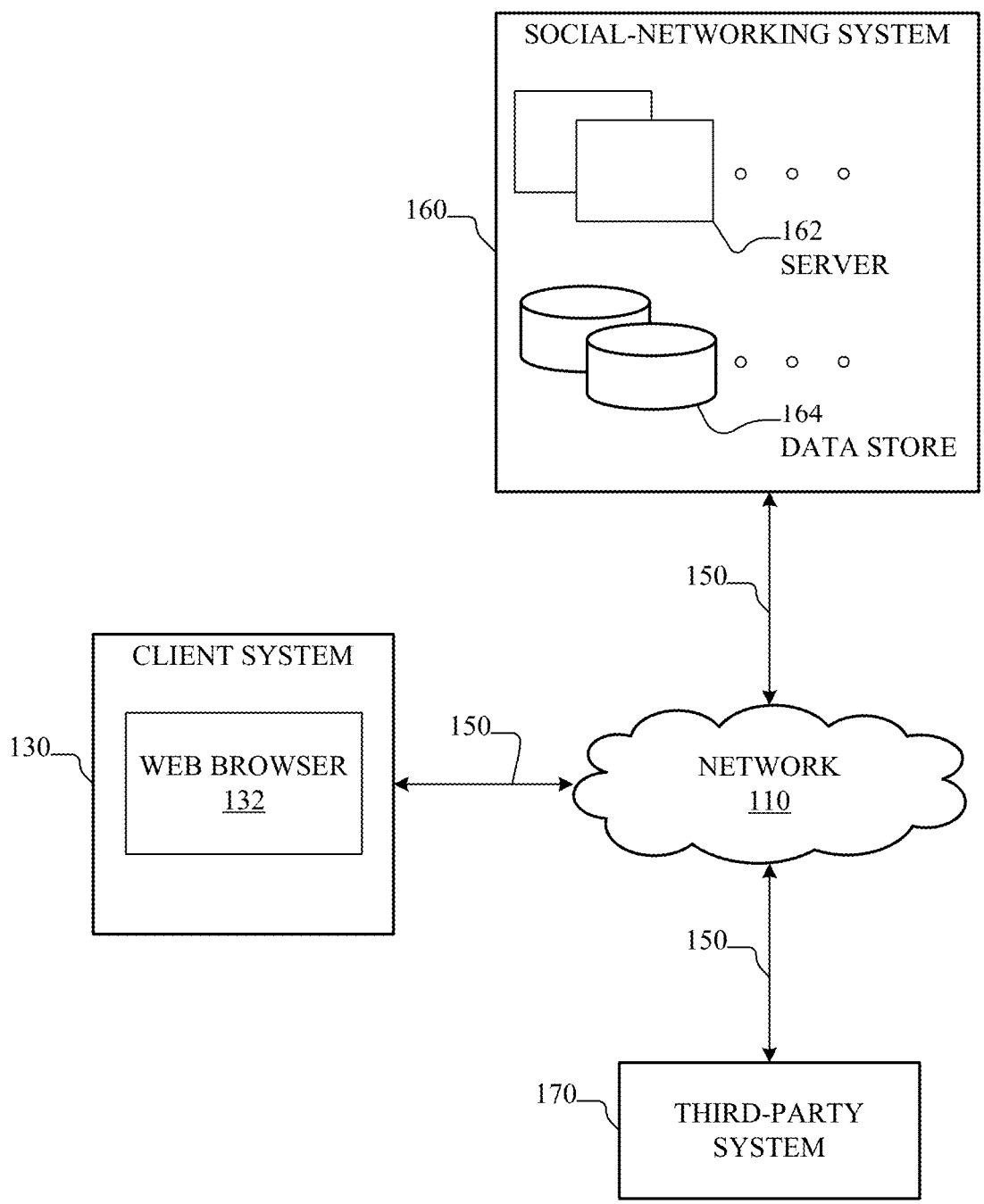
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream. Social-networking system 160 may be configured for users to generate "event" content objects. As an example and not by way of limitation, the user may configure an "event" with attributes including time and date of the event, geo-location of the "event" and a guest list that includes one or more "friends" that are invited to the "event." The "friends" included on the guest list may receive an invitation to the "event" and respond to it by, for example, accepting the invitation or declining it.

One or more photos stored on client system 130 (i.e. "camera roll") may be uploaded to social-networking system 160. As an example and not by way of limitation, client system 130 may automatically and without manual input from a user upload the images stored on client system 130 to social-networking system 160 through photo-synching depending on settings of the user, as described below. In particular embodiments, an application or operating system (OS) of client system 130 may upload images to the social-networking 160 or third-party 170 system, where the images may be saved to an archive or space of the user. As described below, social-networking 160 or third-party 170 system may also include images received from users of social-networking 160 or third-party 170 system in a shared archives or space. The user may designate as "private" one or more of the images or grant access to one or more of the images to certain users of social-networking system 160 based at least in part on privacy settings of the user, as described below.

In particular embodiments, social-networking system 160 may share images associated with a particular "moment" with one or more "friends" in response to receiving a signal from a user interface (UI) of client system 130. Herein, the term "moment" may refer to events associated with a particular date and time period or at a particular geo-location. In particular embodiments, the images of the "camera roll" may clustered into "moments" associated with a particular event at a particular date or time. Images of the "camera roll" of the user may be grouped in accordance with one or more criteria. In particular embodiments, images may be grouped into "moments" based at least in part on metadata associated with the images, information associated with the images inferred from social-graph information, or any combination thereof. Although this disclosure describes clustering of images from a particular source using particular metadata and inferred information, this disclosure contemplates clustering of images from any suitable source, such as for example shared images of one or more "friends" of the user or images uploaded from a digital camera device, using any suitable data. As an example and not by way of limitation, an image may be associated with metadata relating to file size, resolution, time stamp, global positioning system (GPS) location data, if enabled by the user, or any combination thereof. In particular embodiments, clustering of the images of the "camera roll" by social-networking system 160 may based at least in part on information associated with images automatically generated and associated with the images during the image capturing process or information that is inferred based at least in part on analysis by social-networking system 160 of one or more of the images.

As another example, social-networking system 160 may group one or more images based at least in part on information inferred by social-networking system 160. For example, social-networking system 160 may group one or more images based at least in part on computer vision analysis determining whether the images have similar composition or characteristics, such as for example common shapes or lighting conditions. As another example, social-networking system 160 may identify one or more "friends" of the user present in one or more images through facial recognition, described below, and group these images into a cluster. As another example, social-networking system 160 may cluster one or more images with a time stamp that corresponds to an "event" invitation, "check-in" or status update.

Although this disclosure describes clustering of images using particular methodologies with particular criteria or data, this disclosure contemplates clustering of images using any suitable methodology or combination of methodologies with any suitable criteria or combination of data. Furthermore, this disclosure contemplates grouping of any suitable media, such as for example, video (e.g. MPEG4) or audio (e.g. WAV or MP3) files, into any suitable clusters. In particular embodiments, the images of the "camera roll" may grouped into "moments" based at least in part on a time stamp and location data associated with the images. The images in the "camera roll" may be sequentially analyzed to determine whether a current image should be grouped with the previous image. In particular embodiments, an image that was captured within a first pre-determined amount of time of the previous image, such as for example, half an hour, may be clustered with the previous image. In particular embodiments, an image that was captured more than a second pre-determined amount of time (that is larger than the first pre-determined amount of time) from the previous image, such as for example, three hours, may be placed in a cluster separate from the previous image. In particular embodiments, a standard deviation from a geo-location associated with the clustered images may be determined for images captured at a time more than the first pre-determined amount of time and less than the second pre-determined amount of time from the previous image. As an example and not by way of limitation, an average amount of movement for the images of the entire "camera roll" may be calculated and if the movement of the current image is within a standard deviation of the average amount of movement of the entire "camera roll," the image is grouped with the previous image.

Social-networking system 160 may automatically and without user input curate and provide a context to the image clusters based at least in part on the metadata associated with the images or information inferred from social-graph information. Information that may be inferred from the images may include information determined based at least in part on automated tagging of "friends" present in one or more images through facial recognition, ambient-location logging of geo-location data of client systems 130 associated with the user or "friends" of the user, activity associated with the users of social-networking system 160, or any combination thereof. As example and not by way of limitation, automatic tagging of "friends" in one or more images may be performed through any suitable facial-recognition algorithm, that for example analyzes facial information found in the images of the "camera roll" and identifies users based on a comparison of facial characteristics associated with a known set of users. As another example, geo-location data of client system 130 associated with users of social-networking system 160 may be logged through polling of the location service of client system 130 and the "friends" associated with a particular cluster of images captured at a particular geo-location. As another example, social-networking system 160 may associate information, such as for example, time, date, geo-location, or name of "friends," from an accepted an "event" invitation or that are included in a "check-in" with a cluster of images captured at a particular geo-location or time frame. As another example, computer vision analysis by social-networking system 160 may associate one or more objects in an image with a particular geo-location.

In particular embodiments, information curating and providing a context for a "moment" may be extracted from metadata associated with the clustered images, information inferred from social-graph information, information inferred through analysis of the clustered images, or any combination thereof. As an example and not by way of limitation, curating information associated with a "moment" may include a time, date, geo-location, or information identifying "friends" associated with the "moment." For example, an "event" on social-networking system 160 at a particular geo-location, such as for example Pizza Delfina, with a particular user may result in a photo-viewer UI of client system 130 displaying an image cluster associated with the dinner event that has an automatically generated curating information, such as for example "Dinner at Pizza Defina with Russ."

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. Social-networking system 160 or third-party system 170 may, automatically and without manual input, poll client system 130 for location data, as described below. In particular embodiments, social-networking 160 or third-party 170 system may receive and log location data of client system 130 through polling client system 130 for location data, the user initiating a location update, a "check-in" performed by the user, or any combination thereof, depending on one or more privacy settings as appropriate.

In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130.

Information may be pushed to a client system 130 as notifications, or information may be pulled from client system 130 responsive to a request received from client system 130.

In particular embodiments, social-networking system 160 may automatically and without manual input prompt the user provide access to one or more images with one or more "friends." As an example and not by way of limitation, social-networking system 160 may prompt the user provide access to one or more images captured by the user that may be socially relevant to one or more "friends." As another example, the one or more images may be a particular cluster of images associated with a particular "moment" that is relevant to the "friends." Furthermore, social-networking system 160 may automatically detect a "moment" has transpired and may automatically and without user input, prompt the user to share an image cluster associated with the "moment" with the "friends" who may have also attended the "moment."

In particular embodiments, social-networking system 160 may infer an audience or group of relevant "friends" that are associated with the images. Furthermore, inference of the relevant "friends" may be based at least in part on social-graph information, such as a guest list of an "event" invitation, "check-in" associated with the event that tags one or more "friends," facial recognition of "friends" who use social-networking system 160 in the cluster of images, determination of "friends" that were at the particular geo-location associated with the cluster of images (e.g. through polling of the location service of client system 130 of the "friends"), or any combination thereof. As an example and not by way of limitation, social-networking system 160 may send a push notification to prompt the user to share one or more images with the audience inferred by social-networking system 160. As another example, a push notification sent by social-networking system 160 may initiate presentation of a modal window on a display of one or more client systems 130 that prompts the user to share a cluster of images associated with a particular "moment" with the relevant "friends." Although this disclosure describes prompting the user or relevant "friends" through a particular notification, this disclosure contemplates prompting the user through any suitable notification, such as for example short message service (SMS) message, multimedia messaging service (MMS) message, instant messaging (IM), or email.

In particular embodiments, social-networking system 160 may automatically and without manual input prompt one or more "friends" to request the user provide access to one or more images captured by the user. As an example and not by way of limitation, social-networking system may prompt one or more "friends" to request access to one or more images captured by the user that may be socially relevant to one or more "friends." Furthermore, the images may be a cluster of images associated with a particular "moment" that is relevant to the "friends." As another example, social-networking system 160 may send a push notification to prompt relevant "friends" whom social-networking system 160 determines were present at a particular "moment" to request access to the particular image cluster associated with the relevant "friends." As another example, a push notification sent by social-networking system 160 may initiate presentation of a modal window on a display of one or more client systems 130 associated with each of the inferred "friends" to request the user provide access to a cluster of images associated with the particular "moment."

In particular embodiments, social-networking system 160 may determine one or more images captured by client systems 130 of a "friend" may be associated with a particular "moment" shared with the user. Furthermore, social-networking system 160 may automatically and without manual input, prompt one or more relevant "friends" to provide access to one or more images that may be socially relevant to the user. As an example and not by way of limitation, a notification sent by social-networking system 160 may prompt one or more "friends" to upload one or more images to a shared space or archive hosted on social-networking system 160, as described below. Furthermore, each of the images uploaded for sharing may be associated with the particular "moment" shared by the "friends" and the user. In particular embodiments, social-networking system 160 may provide thumbnails of images for approval by the "friends" along with the request to provide access to the images to the user or the shared archive. In particular embodiments, one or more images uploaded by the user or one or more "friends" may automatically be included in the shared archive associated with the particular "moment," as described below.

In particular embodiments, images clustered into "moments" may be stored in a shared space or archive that is accessible by the user and "friends" associated with the moment as determined by a privacy settings of the user, as appropriate. In particular embodiments, the shared-archive creation process may automatically and without manual input create a shared space based at least in part on identification of the "moment" shared between the user and "friends" of the user relevant to the particular "moment." In particular embodiments, the shared space may be maintained as a hub node in a social graph or other data structure maintained by social networking system 160. As an example and not by way of limitation, the shared space may be shared as part of a "wall" of an existing group on social-networking system 160, a "wall" associated with an "event" corresponding to the "moment," a message with a link to the shared space, shared album, or any combination thereof. In particular embodiments, the shared-archive creation process may operate in conjunction with a client-side application hosted on one or more client systems 130. Although this disclosure describes particular methods of sharing images between users, this disclosure contemplates any suitable method of sharing images between users, such as for example, sending images directly to users, modifying privacy settings associated with the images, uploading the images to a shared space, or any combination thereof.

Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g. third-party system 170), such as for example, by setting appropriate privacy settings. The authorization server of social-networking system 160 may be used to enforce one or more privacy settings of users of social-networking system 160. A privacy setting of a user determines how particular information or content objects associated with the user may be shared. In particular embodiments, a determination of the content of displayed by a UI provided by social-networking system 160 for clusters of images or prompted sharing of image clusters may be restricted based on the privacy settings of users of social-networking system 160. As an example and not by way of limitation, social-networking system 160 may restrict access to one or more images captured by users for display on an image-viewer UI or prompted sharing of clustered images based at least in part on a privacy setting of user, as appropriate. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to the user.

Figure 2:
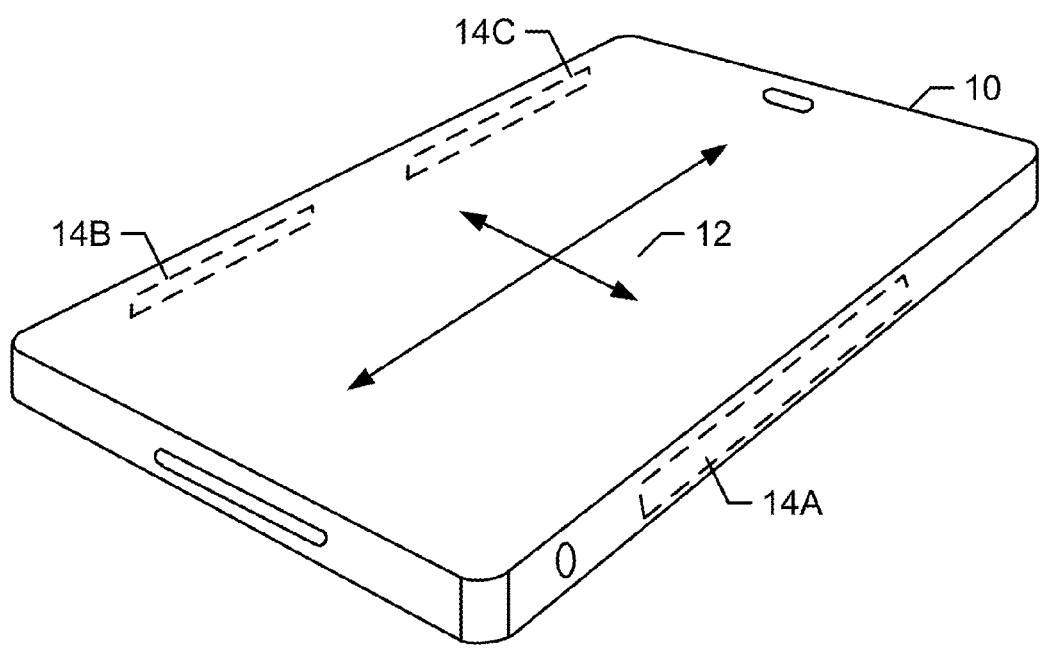
FIG. 2 illustrates an example mobile device.

FIG. 2 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 2, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 2, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, the social-networking system or the third-party system may poll or "ping" mobile computing device 10 using a activation signal to obtain location information. As an example and not by way of limitation, the social-networking system may poll the application of mobile device 10 for location data by sending the activation signal activate the location service of mobile computing device 10. The activation signal may be transmitted using a wireless communication protocol such as for example, WI-FI or 3G and received by mobile computing device 10 through one or more antennae 14A-B. In particular embodiments, the location service of mobile computing device 10 may use one or more methods of location determination, such as for example, using the location of one or more cellular towers, crowd-sourced location information associated with a WI-FI hotspot, or the GPS function of mobile computing device 10. As described above, the social-networking system may, automatically and without manual input, determine a geo-location associated with mobile computing device 10 based in part on the location data provided by mobile computing device 10. Alternatively, the social-networking or third-party system may receive location data of mobile computing device 10 through the user initiating a location update, through a "check-in" performed by the user, or any combination thereof.

In particular embodiments, mobile computing device 10 may include an image sensor configured to capture individual photo images or a series of images as a video. An application executed on mobile computing device 10 may provide image management capabilities for images captured through the image sensor of mobile computing device 10. In particular embodiments, an image processing module within mobile computing device 10 may receive images captured by the image sensor. Furthermore, one or more images captured by the image sensor may be stored on storage component of mobile computing device 10 and may collectively be referred to as a "camera roll."

In particular embodiments, one or more images of the "camera roll" may be sent to the social-networking or third-party system through a communication network, described above. In particular embodiments, images captured by the image sensor and stored in the storage component within mobile computing device 10, may be uploaded to the social-networking or third-party system using an application or image-uploading functionality built into the OS of mobile computing device 10. As an example and not by way of limitation, images that are stored on mobile computing device 10 may be automatically uploaded to the social-networking or third-party system. Furthermore, one or more images captured using the image sensor of mobile computing device 10 may be automatically and without input from the user uploaded to the social-networking or third-party system substantially immediately upon being captured or at some later time. Although this disclosure illustrates and describes a particular type of computing device, this disclosure contemplates a UI configured to display images clustered in "moments" implemented on any suitable type of computing device, such as for example, a personal computer, tablet computer, connected television, or a smartphone. As described below, mobile computing device 10 may display a UI that may configured to display images clustered in "moments" on mobile computing device 10.

Figure 3:
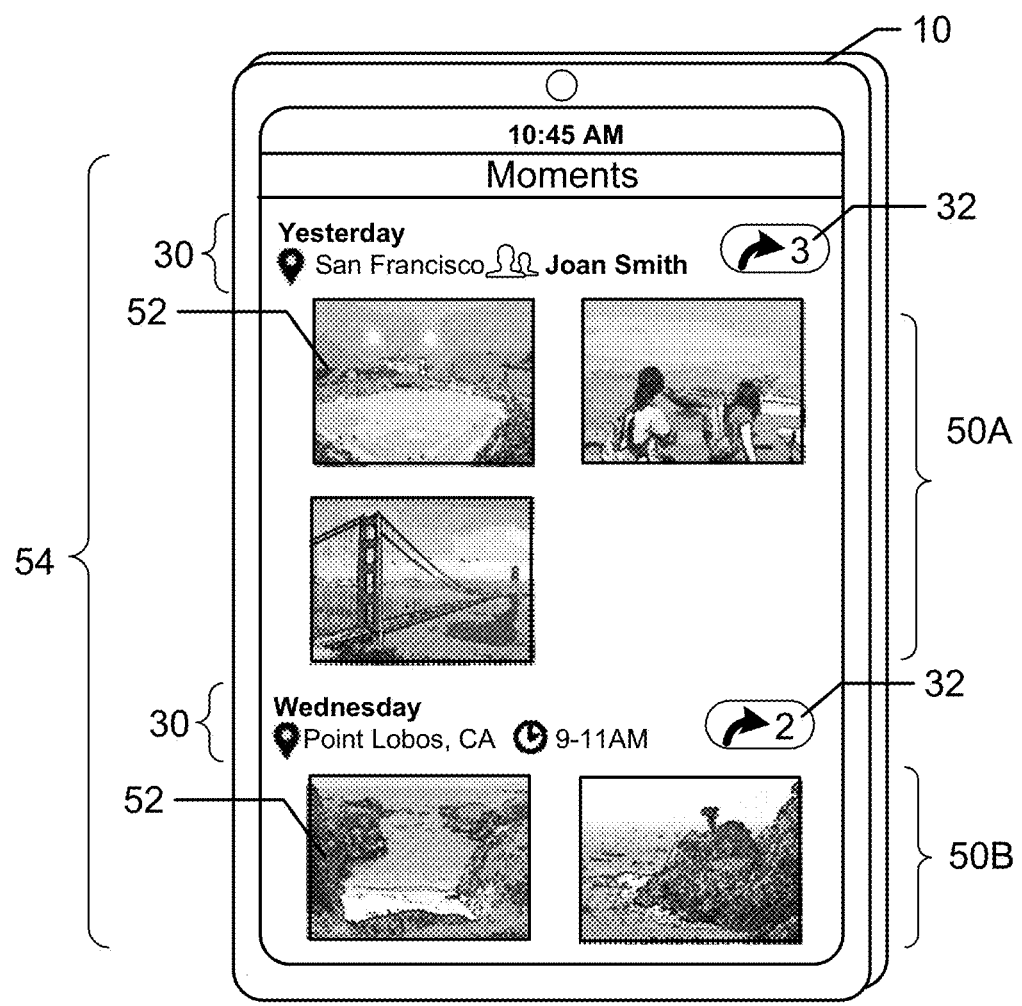
FIG. 3 illustrates an example wireframe for an example user interface with example images.

FIG. 3 illustrates an example wireframe for an example user interface with example images. As described above, a UI 54 may be configured to display one or more images 52. In particular embodiments, the user may navigate through images 52 by scrolling (e.g. swiping a finger vertically across a display of mobile computing system 10 on which images 52 are displayed). In particular embodiments, the images 52 may be displayed as "thumbnail" images that are a representation of a larger sized image. UI 54 may be configured to display images 52 that are organized based on one or more criteria, such as for example "moments," as described above. In the example of FIG. 3, UI 54 may include an image area 50A-B associated with each "moment" for display of images 52. Images 52 associated with the particular "moment" may be automatically and without user input curated using information that is displayed in information areas 30A-B. The curating information may be extracted from metadata associated with images 52 of the particular "moment," inferred from the social-graph information of the user or "friends" of the user, or a combination thereof. As an example and not by way of limitation, information areas 30A-B may be configured to curate a "moment" with information associated with a geo-location (e.g. location where image 52 was captured), time (e.g. when image 52 was captured), "friends" of the user associated with the "moment," or any combination thereof. In particular embodiments, "moments" displayed on UI 54 may be separated by information areas 30. In particular embodiments, UI 54 may include one or more interactive elements 32 configured to provide access to the clustered images associated with a "moment" with one or more "friends" associated with the "moment." As an example and not by way of limitation, interactive element 32 may provide an indication of the number of images 52 associated with a particular "moment" that may be shared. Although this disclosure illustrates and describes a particular UI configured for displaying images having a particular configuration of particular UI elements, this disclosure contemplates any suitable UI configured for displaying images having any suitable configuration of any suitable UI elements, such as for example displaying curating information at a fixed position during scrolling of images or an interactive element to toggle display the images based on one or more criteria.

In the example of FIG. 3, images 52 clustered into a particular "moment" associated with a particular geo-location, time, and "friend" are displayed in display area 50A and curated with information displayed in 30A. As described above, the date and location (e.g. "yesterday" and "San Francisco") associated with the particular "moment" may be determined from the time stamp and location data of the images 52 and "friends" (e.g. "Joan Smith") may be determined the social-networking system by, for example, facial-recognition analysis of images 52 or a status update from "Joan Smith" that tags the user and at a time or geo-location that corresponds to the "moment." As another example, images 52 associated with another particular "moment" may be displayed in display area 50B and curated using information displayed in information area 30B. Furthermore, the date or time associated with the images 52 displayed in display area 50B may be determined by the social-networking system based at least in part on metadata of the images 52 and determination of the geo-location may be based at least in part on logging location data of mobile computing device 10 by the social-networking system. Although this illustrates and describes curating images with particular information determined through particular methodologies, this disclosure contemplates curating images with any suitable information or combination of information, such as for example geo-location, time, date, or "friends," determined through any suitable methodology, such as for example facial recognition or logging location data.

Figure 4:
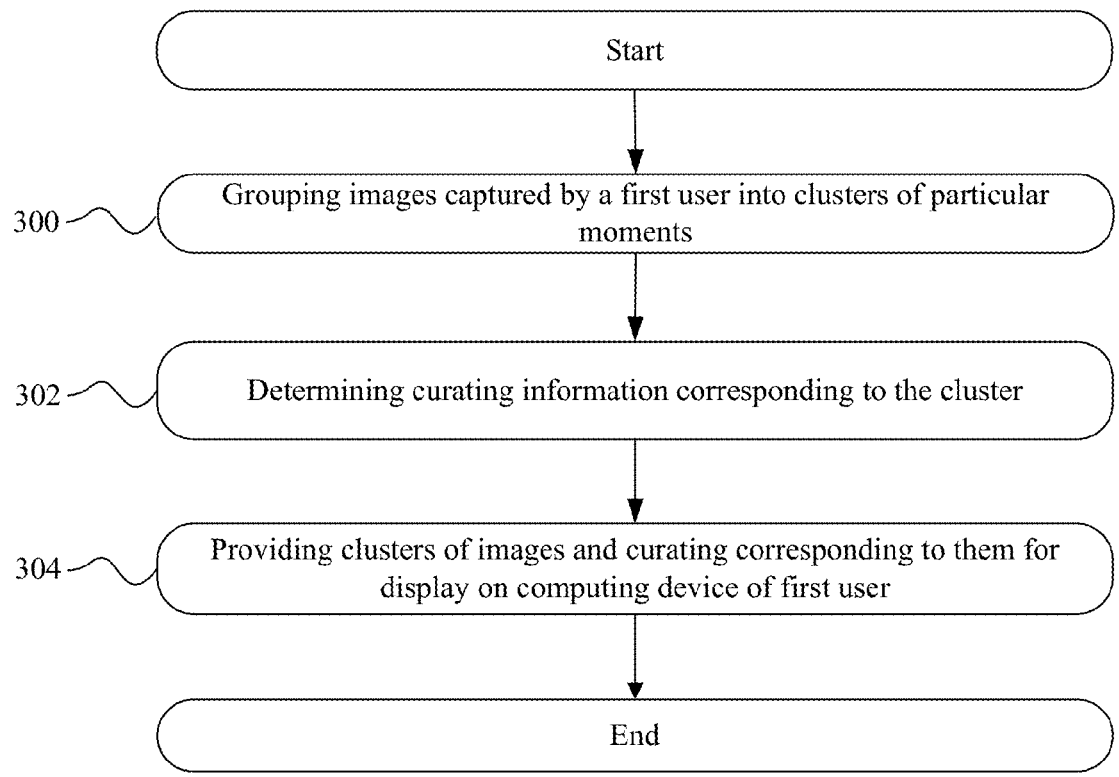
FIG. 4 illustrates an example method for socialized clustering of images.

FIG. 4 illustrates an example method for socialized clustering of images. The method may start at step 300, where a computing device automatically and without user input groups one or more images captured by a first user into clusters of particular moments. As an example and not by way of limitation, each particular moment may be associated with a particular geo-location and time. In particular embodiments, the grouping may be based at least in part on metadata associated with one or more of the images or data determined through analysis of one or more of the images. Step 302 determines curating information corresponding to each of one or more of the clusters. In particular embodiments, the determination of curating information may be performed by the computing device and may be based at least in part on the metadata associated with images in the cluster, the data determined through analysis of images in the cluster, or social-graph information associated with images in the cluster. At step 304, the computing device provides the clusters of images and at least some of the curating information corresponding to them for display on a computing device of the first user, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
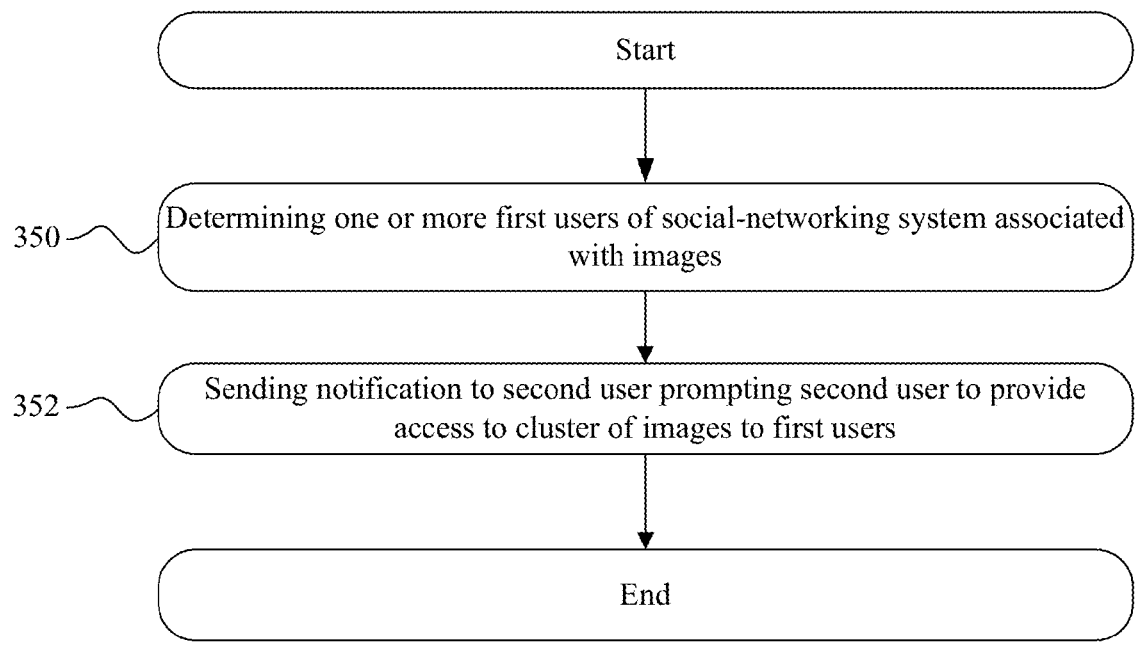
FIG. 5 illustrates an example method for prompted sharing of images.

FIG. 5 illustrates an example method for prompted sharing of images. The method may start at step 350, where a computing device automatically and without manual input determines one or more first users of a social-networking system associated with one or more images. In particular embodiments, the computing device comprises a social-networking system. In particular embodiments, the determination may be based at least in part on social-graph information associated with or analysis of one or more images that have been captured by a second user of the social-networking system. At step 352, the computing device automatically and without user input sends a notification to a computing device of the second user prompting the second user to provide access to the images to one or more of the first users, at which point the method may end. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
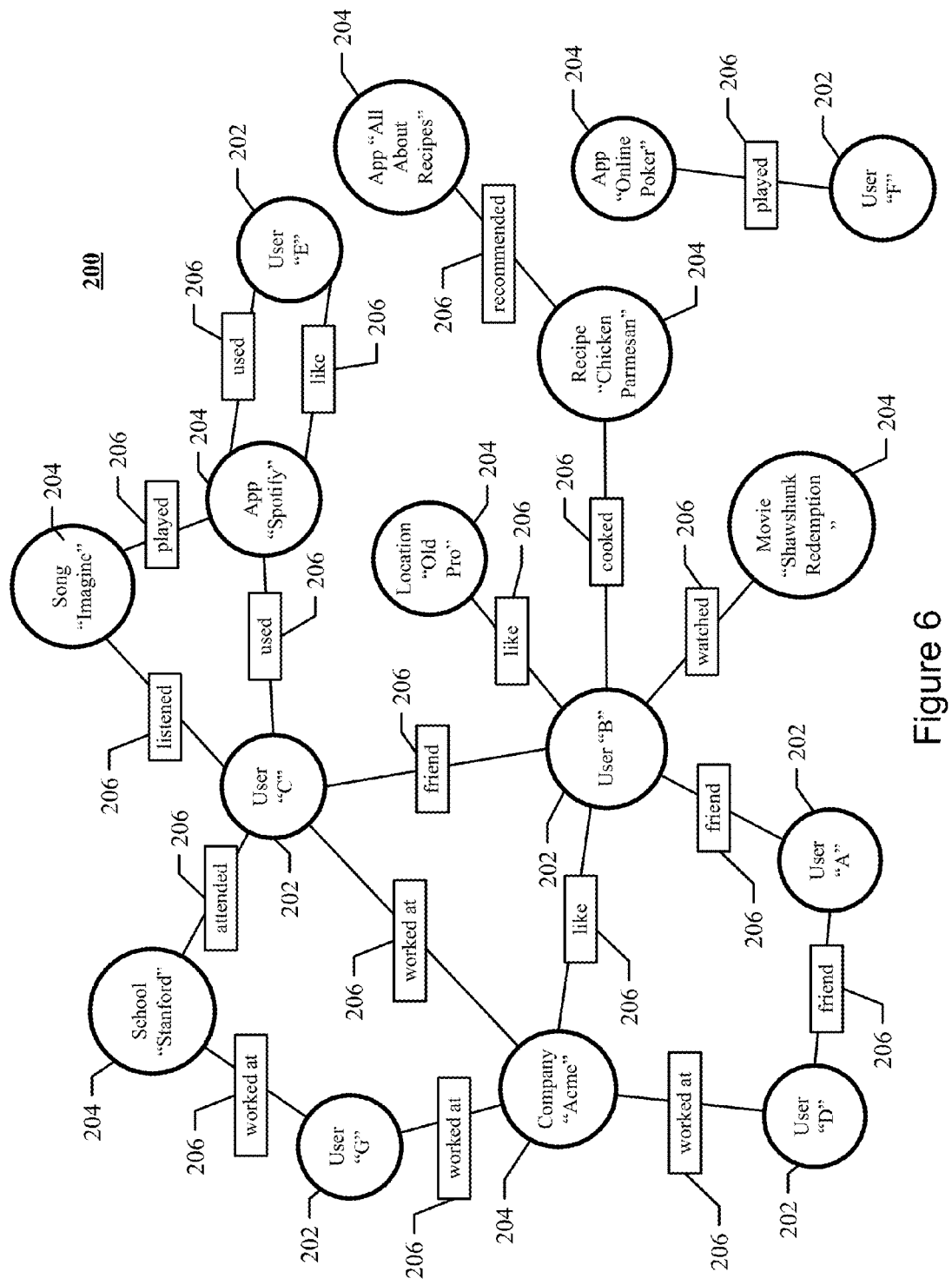
FIG. 6 illustrates an example social graph.

FIG. 6 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 6 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, user node 202 may be associated with facial-recognition data extracted from one or more images of the user, depending on a privacy setting of the user. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 6, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 6, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 6) between user nodes 202 corresponding to the user and concept nodes 204 corresponding to the song and application to indicate that the user listened to the song and used the application. Moreover, social-networking system 160 may create a "played" edge 206 (as illustrated in FIG. 6) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 6 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 7:
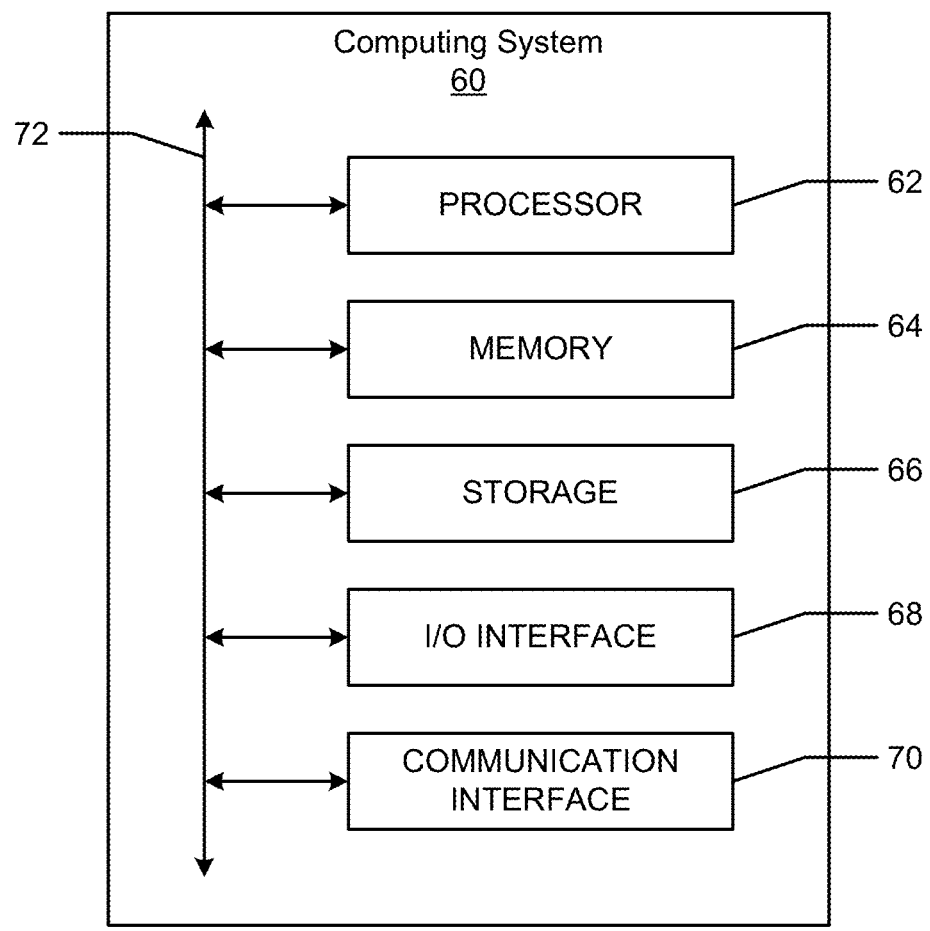
FIG. 7 illustrates an example computing system.

FIG. 7 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, automatically and without user input grouping one or more images captured by a first user into clusters of particular moments based at least in part on metadata associated with one or more of the images or data determined through analysis of one or more of the images, each particular moment being associated with a particular geo-location and time;
    by the computing device, for one or more of the clusters, determining curating information comprising information identifying one or more second users present at the particular geo-location and time, the determining being based at least in part on:
        social-graph information associated with the first user;
        social-graph information associated with one or more of the second users; and
        socially relevant activity of one or more of the second users that is related to the particular geo-location and time, wherein the social-graph information comprises a social graph including a plurality of nodes and edges connecting the nodes, and wherein at least one node in the social graph corresponds to the first user and at least one node in the social graph corresponds to one of the second users; and
    by the computing device, providing, for each of the one or more of the clusters, the images and a selected portion of the curating information for display on a computing device of the first user, wherein the provided curating information identifying one or more of the second users present at the particular geo-location and time is selected based on one or more edges in the social graph connecting one of the nodes corresponding to the second users to the node corresponding to the first user.

2. The method of claim 1, wherein the identification of one or more of the second users is further based at least in part on analyzing facial-recognition data, location data associated a computing device of one or more of the second users, or a content object of one or more of the second users on the social-networking system that is socially relevant to the first user.

3. The method of claim 2, wherein the content object comprises a status update, check-in, or event invitation that includes the first user.

4. The method of claim 1, wherein grouping comprises, by the computing device, grouping a current image with a previous image based at least in part on a pre-determined time or distance differential threshold between the current image and the previous image.

5. The method of claim 4, wherein the distance differential threshold comprises a standard deviation of an average amount of movement of the images.

6. The method of claim 1, wherein the grouping comprises, by the computing device, grouping a current image with a previous image based at least in part on the current image having similar characteristics or composition as the previous image.

7. The method of claim 6, wherein the similar characteristics comprise one or more objects or second users common to the current image and the previous image.

8. One or more computer-readable non-transitory storage media comprising memory embodying software configured when executed to:
    automatically and without user input group one or more images captured by a first user into clusters of particular moments based at least in part on metadata associated with one or more of the images or data determined through analysis of one or more of the images, each particular moment being associated with a particular geo-location and time;
    for one or more of the clusters, determine curating information comprising information identifying one or more second users present at the particular geo-location and time, the determining being based at least in part on:

social-graph information associated with the first user;
social-graph information associated with one or more of the second users; and
socially relevant activity of one or more of the second users that is related to the particular geo-location and time, wherein the social-graph information comprises a social graph including a plurality of nodes and edges connecting the nodes, and wherein at least one node in the social graph corresponds to the first user and at least one node in the social graph corresponds to one of the second users; and provide, for each of the one or more of the clusters, the images and a selected portion of the curating information for display on a computing device of the first user, wherein the provided curating information identifying one or more of the second users present at the particular geo-location and time is selected based on one or more edges in the social graph connecting one of the nodes corresponding to the second users to the node corresponding to the first user.

9. The media of claim 8, wherein the identification of one or more of the second users is further based at least in part on analyzing facial-recognition data, location data associated a computing device of one or more of the second users, or a content object of one or more of the second users on the social-networking system that is socially relevant to the first user.

10. The media of claim 9, wherein the content object comprises a status update, check-in, or event invitation that includes the first user.

11. The media of claim 8, wherein the software is configured to group a current image with a previous image based at least in part on a pre-determined time or distance differential threshold between the current image and the previous image.

12. The media of claim 11, wherein the distance differential threshold comprises a standard deviation of an average amount of movement of the images.

13. The media of claim 8, wherein the software is further configured to group a current image with a previous image based at least in part on the current image having similar characteristics or composition as the previous image.

14. The media of claim 13, wherein the similar characteristics comprise one or more objects or second users common to the current image and the previous image.

15. A device comprising:
a processor; and
one or more computer-readable non-transitory storage media coupled to the processor and embodying software that:

automatically and without user input group one or more images captured by a first user into clusters of particular moments based at least in part on metadata associated with one or more of the images or data determined through analysis of one or more of the images, each particular moment being associated with a particular geo-location and time;

for one or more of the clusters, determine curating information comprising information identifying one or more second users present at the particular geo-location and time, the determining being based at least in part on:
social-graph information associated with the first user;
social-graph information associated with one or more of the second users; and
socially relevant activity of one or more of the second users that is related to the particular geo-location and time, wherein the social-graph information comprises a social graph including a plurality of nodes and edges connecting the nodes, and wherein at least one node in the social graph corresponds to the first user and at least one node in the social graph corresponds to one of the second users; and provide, for each of the one or more of the clusters, the images and a selected portion of the curating information for display on a computing device of the first user, wherein the provided curating information identifying one or more of the second users present at the particular geo-location and time is selected based on one or more edges in the social graph connecting one of the nodes corresponding to the second users to the node corresponding to the first user.

16. The device of claim 15, wherein the identification of one or more of the second users is further based at least in part on analyzing facial-recognition data, location data associated a computing device of one or more of the second users, or a content object of one or more of the second users on the social-networking system that is socially relevant to the first user.

17. The device of claim 15, wherein the software is configured to group a current image with a previous image based at least in part on a pre-determined time or distance differential threshold between the current image and the previous image.

18. The device of claim 17, wherein the distance differential threshold comprises a standard deviation of an average amount of movement of the images.

* * * * *